United States Patent [19]

Branan, Jr. et al.

[11] Patent Number: 5,173,795
[45] Date of Patent: Dec. 22, 1992

[54] OPTICALLY CONTROLLED RADIO

[75] Inventors: M. William Branan, Jr., Plantation; John D. Wetters, Coral Springs, both of Fla.

[73] Assignee: Motorola, Inc., Schaumburg, Ill.

[21] Appl. No.: 730,021

[22] Filed: Jul. 12, 1991

Related U.S. Application Data

[63] Continuation of Ser. No. 329,463, Mar. 28, 1989, abandoned.

[51] Int. Cl.⁵ ............................................ H04B 10/00
[52] U.S. Cl. .................... 359/142; 359/147; 359/148; 455/89
[58] Field of Search ............ 455/89, 88, 92, 95; 359/109, 142, 143–148, 152

[56] References Cited

U.S. PATENT DOCUMENTS

| | | | |
|---|---|---|---|
| 3,968,564 | 7/1976 | Springthorpe | 29/580 |
| 4,104,617 | 8/1978 | Bean et al. | 359/147 |
| 4,188,708 | 2/1980 | Frederiksen | 29/572 |
| 4,225,213 | 9/1980 | McBride, Jr. et al. | 350/96.20 |
| 4,291,411 | 9/1981 | Muller et al. | 455/88 |
| 4,306,314 | 12/1981 | Griffiths | 359/173 |
| 4,325,142 | 4/1982 | Nakazawa | 455/89 |
| 4,373,778 | 2/1983 | Adham | 350/96.20 |
| 4,432,604 | 2/1984 | Schwab | 350/96.21 |
| 4,465,333 | 8/1984 | Caserta et al. | 350/96.20 |
| 4,485,391 | 11/1984 | Poulain et al. | 357/19 |
| 4,524,461 | 6/1985 | Kostanty et al. | 455/88 |
| 4,553,811 | 11/1985 | Becker et al. | 350/96.20 |
| 4,553,813 | 11/1985 | McNaughton et al. | 350/96.20 |
| 4,563,162 | 1/1986 | Ishimoto | 359/142 |
| 4,585,300 | 4/1986 | Landis et al. | 350/96.20 |
| 4,611,886 | 9/1986 | Cline et al. | 350/96.20 |
| 4,732,446 | 3/1988 | Gipson et al. | 350/96.15 |
| 4,795,900 | 1/1989 | Kokubu | 250/221 |

FOREIGN PATENT DOCUMENTS

| | | | |
|---|---|---|---|
| 0066180 | 12/1982 | European Pat. Off. | 455/606 |
| 2805925 | 8/1979 | Fed. Rep. of Germany | 455/603 |

*Primary Examiner*—Donnie L. Crosland
*Attorney, Agent, or Firm*—Robert S. Babayi

[57] ABSTRACT

A radio device (10) receives optical control signals from a remote control apparatus (22). In one embodiment, both the radio device and remote control apparatus include optical transmitters (58) and receivers (60) so that control and information signals may provided to and received from the radio's operator. In another embodiment, the radio (10') provides a light signal to the remote control apparatus (22') that either permits or prohibits (80) the light signal's return to the radio. In this way, the presence or absence of the return light signal comprises optical control signals to control the radio's operation.

7 Claims, 2 Drawing Sheets

OPTICALLY CONTROLLED RADIO

This is a continuation of application Ser. No. 07/329,463, filed Mar. 28, 1989, and now abandoned.

TECHNICAL FIELD OF THE INVENTION

This invention relates generally to two-way radios, and more specifically to those two-way radios capable of being remotely controlled (in whole or in part) by one or more radio accessories, and is particularly directed toward a radio capable of being remotely controlled by an optically coupled remote speaker/microphone.

BACKGROUND OF THE INVENTION

A portable radio is typically understood to be a radio device capable of being carried on or about the person. FIG. 1 illustrates a conventional portable radio 10. The portable radio 10 includes a display 12 and a speaker 14 by which data and voice message are respectively presented to the radio operator. A keypad area 16 and a microphone (typically mounted behind the speaker grill and not visible in FIG. 1) enable the radio user to originate calls and participate in communications with other radio operators. To control the operation of the radio 10, control knobs 18 are used to change parameters, enable or disable functions, and otherwise modify the performance of the radio. Also, the radio 10 is controlled by a push-to-talk (PTT) switch 20, which is activated whenever the operator desires to transmit.

While portable radios are readily operable as handheld devices, it is customary for portable radio users to carry ("wear") their radio about hip level either by virtue of a clip arrangement or by using a carry-case. However, some portable radio users dislike having to repeatedly pickup and return their portable radio to the carry case. Moreover, since the speaker 14 is ordinarily at hip level, it is sometimes difficult to hear messages communicated via the radio.

Accordingly, many portable radio users prefer to use a radio accessory commonly referred to as a remote speaker/microphone 22. The remote speaker/microphone 22 is coupled to the radio 10 via cable 24 that contains one or more wires so that data and voice messages received by the radio 10 may be presented to the operator by the display 12' and 14' respectively. Also, a keypad 16' and microphone (typically mounted behind the speaker grill and not visible in FIG. 1) enable the radio operator originate and participate in calls by activating the PTT switch 20' without having to physically moving the radio from the hip level position. Ordinarily, the remote speaker/microphone 22 is worn (carried) either at the operator's shoulder level or shirt-pocket level. Accordingly, since the speaker 14', display 12', and microphone are conveniently positioned near the operator's head, messages can be heard, displays can be read, and transmissions may be made more conveniently.

Regrettably, the use of a speaker/microphone 22 results in a rather significant detriment. As is known, the radio 10 transmits information by radiating electromagnetic energy from its antenna 26. This radiated energy is picked up by the cable 24, which acts like a receiving antenna and couples unwanted electromagnetic energy into the remote speaker/microphone 22 and the radio 10. The coupled electromagnetic radiation tends to re-bias electronic circuits and devices within the radio 10 and the remote speaker/microphone 22 degrading their performance to an unacceptable level.

Some radio designers have attempted to compensate for this detriment by incorporating intricate electromagnetic shielding arrangements into their portable radios. However, designing such shielding arrangements is complicated and time consuming. Moreover, the additional of electromagnetic shields increase radio cost, and often, provides only a margin improvement in radio performance. Accordingly, a need exists to provide a remote control accessory for a radio that avoids the problems of the prior art.

SUMMARY OF THE INVENTION

Accordingly, it is an object of the present invention to provide a remote optically controlled radio device that is impervious to unwanted electromagnetic radiation.

Briefly, according to the invention, a radio device receives optical control signals from a remote control apparatus. Since optical signals are not substantially corrupted by passing through an electromagnet environment, unwanted coupling of radiated signals is avoided. In one embodiment, both the radio device and remote control apparatus include optical transmitters and receivers so that control and information signals may be provided to and received from the radio's operator. In another embodiment, the radio provides a light signal to the remote control apparatus that either permits or prohibits the light signal's return to the radio. In this way, the presence or absence of the returned light signal comprises optical control signals to control the radio's operation.

DESCRIPTION OF THE PREFERRED EMBODIMENT

Figure 2:
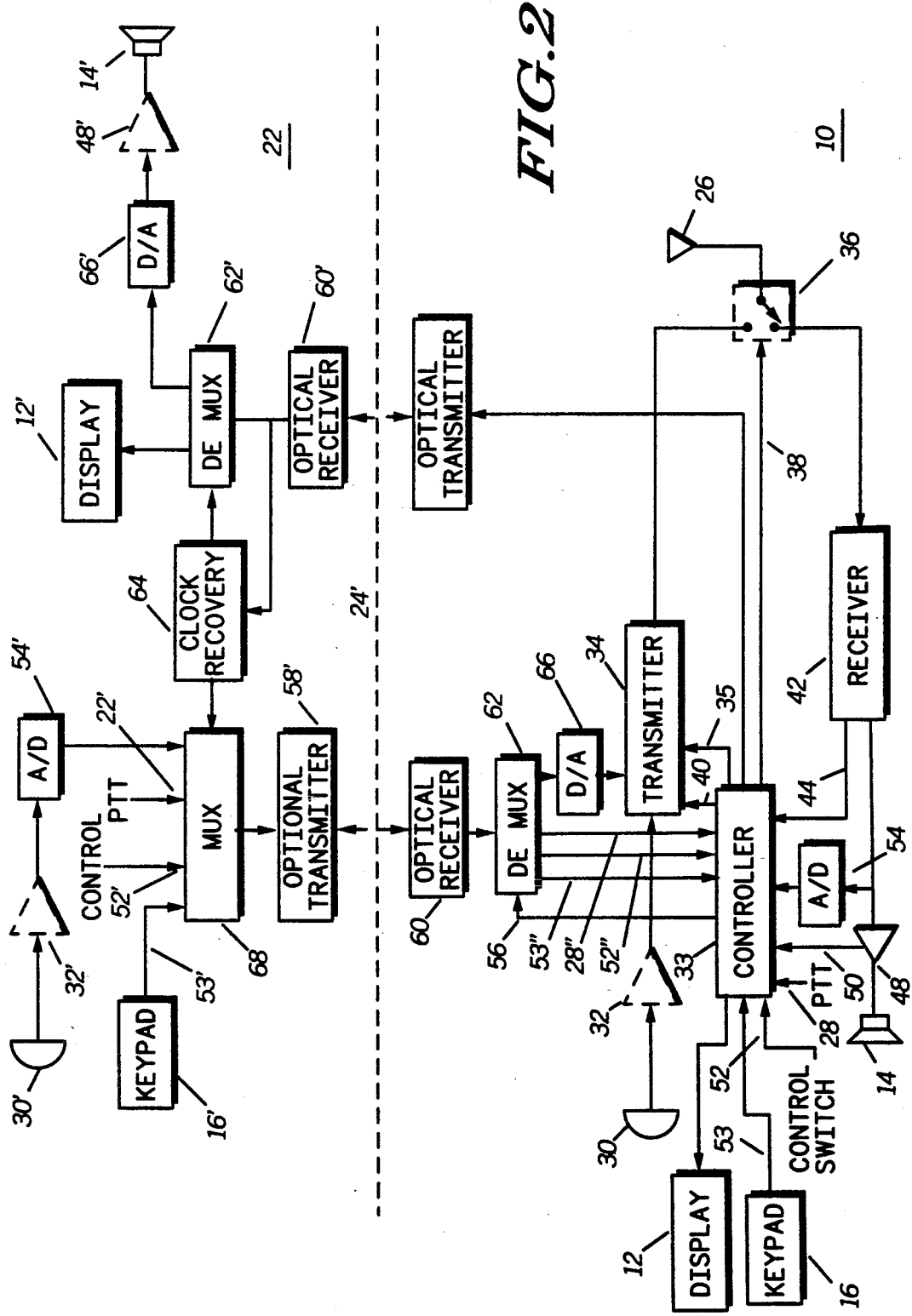
FIG. 2 is a block diagram of a radio device and remote control apparatus according to the invention.

Referring to FIG. 2, a block diagram of a radio 10 and remote speaker/microphone 22 are shown in accordance with the preferred embodiment of the present invention. When used as a hand-held device, the radio 10 transmits an information signal after its operator has activated the PTT switch 20, which causes a PTT activation signal 28 to appear at the radio controller 33. The receipt of the PTT activation signal 28 by the controller 23 causes the controller to activate (35) the transmitter 34, which will transmit any audio energy impressed upon a microphone 30 (which may be optionally preamplified by the amplifier 32). During message transmission, the transmitter 34 is coupled to an antenna 26 via a controlled (38) antenna switch 36. The transmitter 34 also transmits data information provided by the controller 33 via the data transmit line 40. In this way, both voice and data transmissions may be made.

To receive an information signal, the antenna 26 is coupled via the antenna switch 36 to receiver 42. The receiver 42 provides recovered data messages to the controller 33 via receive data line 44. These data messages may include commands or status requests from other radio devices, or may comprise a data message to be displayed on the display 12. The receiver 42 also provides recovered voice messages 46, which are amplified (48) in accordance with the settings of one or more control knobs 18. Control signals 52 from the various control knobs and buttons of the radio 10 are scanned by the controller 33. In the case of the volume setting, the controller determines the appropriate volume level and adjusts (50) the amplifier 48 to present the voice message to the operator via the speaker 14 at the selected audio level.

According to the invention, the radio 10 is operated in conjunction with the remote speaker/microphone 22. To provide voice and data messages to the remote speaker/microphone, received voice messages are digitized (54) and processed by the controller 33 before being coupled to an optical transmitter 58. These digitized messages are processed to incorporate a clock signal 56 that is also provided to the demultiplexer 62 as will be further explained hereinafter. The voice or data signal combined with the clock signal is optically transmitted by the optical transmitter 58 over an optical channel such as a glass fiber to an optical receiver 60'. This clock signal is recovered by a clock recovery circuit 64, which is used to synchronize the demultiplexer 62' so that the optical channel may be shared between data messages intended for the display 12' and voice messages intended for the speaker 14'. (Optionally, the multiplexing of signals onto the optical communication channel may be accomplished asynchronously using techniques known in the art. Synchronous transmission is preferred, however, to maximize information throughput.) Of course, the data messages must first be converted back to analog information via the D/A 66'. The now analog signals may be optionally amplified by the amplifier 48' before being presented to the operator to the speaker 14'.

To transmit using the remote speaker/microphone 22, the radio operator activates the PTT switch 20', which causes the PTT activation signal 28' to appear at the multiplexer 68. When signalled by the clock recovery circuit 64, the PTT activation signal 28' is converted to optical information by the optical transmitter 58', and transmitted across the optical channel to the optical receiver 60 of the radio 10. This signal is demultiplexed by the demultiplexer 62, which is time-synchronized by the data signal 56 supplied from the controller 33. The recovered PTT activation signal 28" is then processed by the controller 30, which responds by activating (35) the transmitter 34. Simultaneously, audio information from the microphone 30' (which may be optionally amplified by the amplifier 32') is digitized by the A/D convertor 54' and routed by the multiplexer 68 to the optical transmitter 58'. The voice signals are carried optically over the optical communication channel to the optical receiver 60. The demultiplexer 62 routes the voice to a D/A convertor 66, which returns the digitized voice signal to analog form before being applied to the transmitter 34. In this way voice information may be carried from the remote speaker/microphone 22 to the transmitter of the radio 10 using an optical communication link as opposed to the conventional copper wire signal channels used by conventional remote speaker/microphones.

In a similar manner, control information 52' from control switches (such as volume adjustments, squelch settings, or frequency selections), and keypad information from the keypad 16' are in turn routed by the multiplexer 68 over the optical communication channel until they are ultimately received by the controller 33 as control information signals 52" and keypad information signals 33".

Thus, the present invention operates to convert electrical control signals and analog voice signals into optical signals when traveling from the remote speaker/microphone 22 to the radio 10. Similarly, communications from the radio 10 to the remote speaker/microphone are also accomplished using optical transmission for any recovered voice information and received data messages. Since optical signals traveling through an optical communication channel are relatively impervious to electro-magnetic energy, the cable 24' carrying the optical communication channel will not act as a receiving antenna to couple stray electromagnetic energy back into the radio 10 or the remote speaker/microphone 22.

Figure 1:
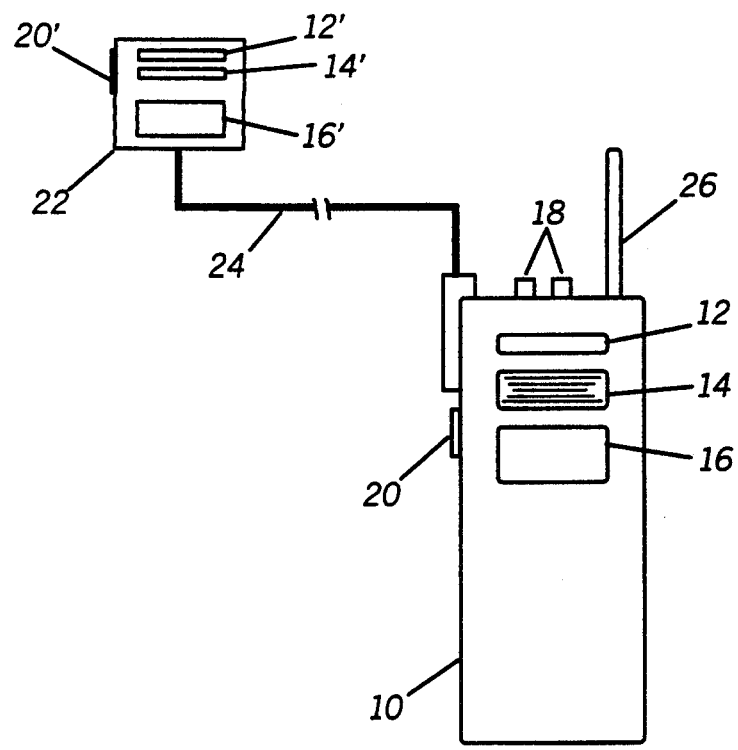
FIG. 1 is an illustration of a conventional radio coupled to a remote speaker microphone.
Figure 3:
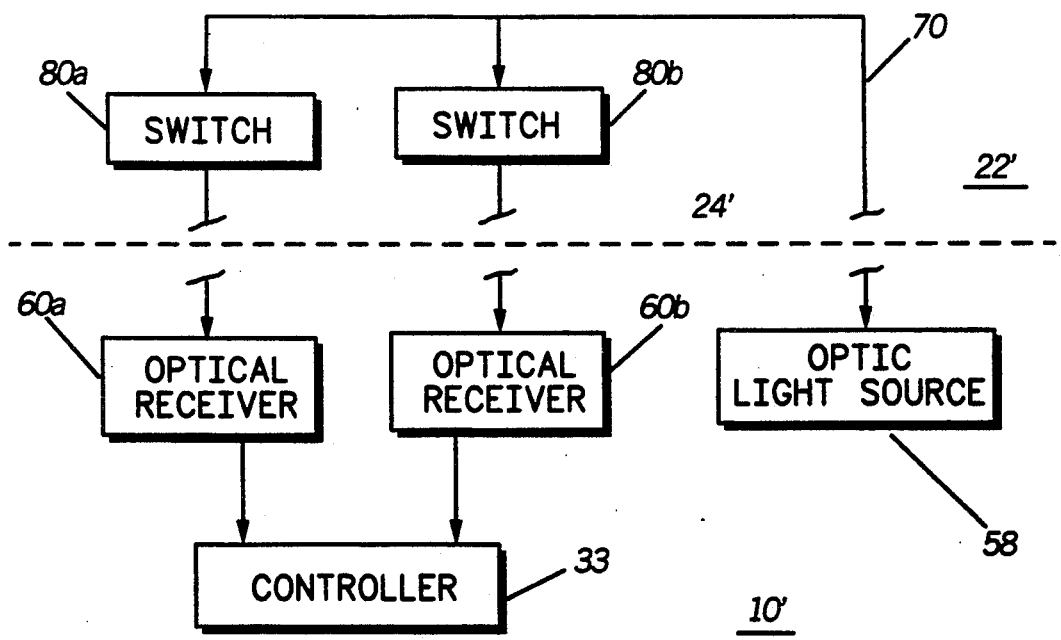
FIG. 3 is an illustration of an alternative embodiment of providing optical control signals.

In another embodiment of the present invention, the remote control switch information is provided to the radio 10 in a somewhat more straightforward and inexpensive manner. In FIG. 3, only a portion of the radio 10 is shown for clarity and ease of understanding. Those skilled in the art will appreciate voice and data information exchange between the radio 10' and the remote speaker/microphone 22' may be made as discussed in conjunction with FIG. 2. Optionally, if only control functions are required, the embodiment of the present invention shown in FIG. 3 provides an inexpensive and reliable approach.

The radio 10' is shown to include an optical light source 58, which sends a light signal (modulated or unmodulated) over the optical communication channel to the remote speaker/microphone 22'. The light signal is routed by a fiber optic link 70 to one or more switches (two shown) 80a and 80b. The switches comprise means for interrupting the return of the light signal to optical receivers 60a and 60b of the radio 10'. As is known, the switches 80a and 80b may comprise devices that absorb the light signal, reflect the light signal, or merely block the light signal so as to selectively prevent or permit the return of the light signal across the optical communication channel.

In the preferred embodiment, each of the switches 80a and 80b ordinarily prevent its return of the light signal to the radio 10'. For example, the switch 80a could correspond to the PTT switch 20'. When activated by the radio operator, the switch 80a would permit light to return over the optical channel and reach the optical receiver 60a. Detection of the light signal by the optical receiver 60a causes the generation of an electronic signal that may be measured (or detected) by the controller 33. After detection of this signal, the controller activates the transmitter and transmits voice or data information as described in conjunction with FIG. 2. As a second example, the switch 80b could comprise a volume control switch, which permits varying amounts of the light signal to return to the radio 10'. By detecting (60b) the variations in the intensity of the returned light signal, the controller 33 varies the radio's volume level. In a similar manner, the radio's operational frequency, squelch threshold, or other operational parameters may be varied.

In summary, the present invention employs an optical channel to provide control and information signals from a remote speaker/microphone to a radio device. The use of optics eliminates the coupling of un-wanted electromagnetic energy into the radio 10, which degrades its performance. In this way, the convenience of using a remote speaker/microphone may be provided to a radio user without suffering the corresponding detriment of degraded radio performance.

What is claimed is:

1. An optically controlled radio, comprising: a radio device including:
   a controller means for controlling at least a portion of said radio device in response to an optical control signal; and
   a light source disposed within the radio device for generating a light signal;
   a remote means for providing said optical control signal including means for receiving said light signal and switch means for selectively permitting or prohibiting passage of said light signal to provide said optical control signal; and
   an optical communication channel disposed between said radio device and said remote means.

2. The radio of claim 1, wherein said radio device includes radio frequency transmitting means for transmitting an information signal to provide a radio frequency signal.

3. The radio of claim 2, wherein said remote means includes means for processing voice or data signals to provide optical data signals, and said radio device includes means for converting said optical data signals into said information signal.

4. The radio of claim 1, wherein said radio device includes radio frequency receiver means for receiving a radio frequency signal to provide a recovered information signal.

5. The radio of claim 4, wherein said radio device includes means for converting said recovered information signal into an optical information signal, and means for transmitting said optical information signal to said remote means.

6. The radio of claim 5, wherein said remote means includes means for receiving said optical information signal from said radio device and means for presenting a signal derived from said optical information signal via a display means or a speaker means.

7. The radio of claim 1, wherein said optical communication channel comprises at least one fiber optic link.

* * * * *